United States Patent
Gray et al.

[19]
[11] Patent Number: 6,082,805
[45] Date of Patent: Jul. 4, 2000

[54] MULTI-PURPOSE RECREATIONAL VEHICLE SEAT HAVING STORAGE COMPARTMENT ACCESS

[75] Inventors: Larry E. Gray, Granger; Keith Swihart, Bristsol, both of Ind.

[73] Assignees: Atwood Mobile Products, Rockford; Flair Interiors, Inc., Bristol, both of Ill.

[21] Appl. No.: 08/931,212

[22] Filed: Sep. 17, 1997

[51] Int. Cl.⁷ ........................................ B60N 2/34
[52] U.S. Cl. ........................... 296/65.09; 296/69; 297/92
[58] Field of Search ............... 296/65.01, 65.05, 296/65.09, 65.16; 297/69, 94, 95, 97, 98, 99, 100, 101, 102, 103, 92, 93, 232, 1; 5/37.1

[56] References Cited

U.S. PATENT DOCUMENTS

| | | |
|---|---|---|
| 1,734,214 | 11/1929 | Jones . |
| 1,962,528 | 6/1934 | Rope ........................................ 296/65 |
| 2,429,260 | 10/1947 | Coopersmith ................................ 5/47 |
| 3,059,964 | 10/1962 | Hoppe et al. ............................. 297/13 |
| 3,165,350 | 1/1965 | Willson ..................... 296/23 |
| 3,751,740 | 8/1973 | Belk ........................................ 5/37.1 |
| 3,844,608 | 10/1974 | Freedman ................................. 297/92 |
| 3,955,846 | 5/1976 | Murphy ................. 296/65 R |
| 4,085,962 | 4/1978 | Wahls ................... 296/65 R |
| 4,266,822 | 5/1981 | Barecki et al. ........................ 296/65 R |
| 4,654,902 | 4/1987 | Shrock et al. .............................. 5/37.1 |
| 4,771,507 | 9/1988 | Draplin et al. ............................. 16/297 |
| 4,779,917 | 10/1988 | Campbell et al. ..................... 296/65.1 |
| 4,793,649 | 12/1988 | Yamano et al. ........................ 296/65.1 |
| 4,955,973 | 9/1990 | Provencher ............................ 296/65.1 |
| 5,039,155 | 8/1991 | Suman et al. ........................... 296/65.1 |
| 5,056,849 | 10/1991 | Norris, Jr. et al. ..................... 296/65.1 |
| 5,197,776 | 3/1993 | Brown ..................................... 296/65.1 |
| 5,238,285 | 8/1993 | Holdampf et al. ..................... 296/65.1 |
| 5,498,052 | 3/1996 | Severini et al. ........................ 296/65.1 |

*Primary Examiner*—D. Glenn Dayoan
*Assistant Examiner*—Jason Morrow
*Attorney, Agent, or Firm*—Banner & Witcoff, Ltd.

[57] ABSTRACT

A multi-purpose seat for use on a recreational vehicle which allows access to a storage space provided below the multi-purpose seat. The present invention provides a multi-purpose seat adapted to be positioned into any one of a bed position, forward sofa position, backward soft position, or storage access position. The multi-purpose seat includes a seat bottom and a seat back which are hingedly attached to a housing provided in a recreational vehicle. A pivot assembly is provided on each end of the seat bottom and seat top to allow the multi-purpose seat to be positioned into any one of the aforementioned positions. Through the use of a novel pivot hinge assembly the present invention allows for access to space which has heretofore been inaccessible for use as a storage area, and moreover, allows the seat to be positioned in forward and backward facing directions.

15 Claims, 8 Drawing Sheets

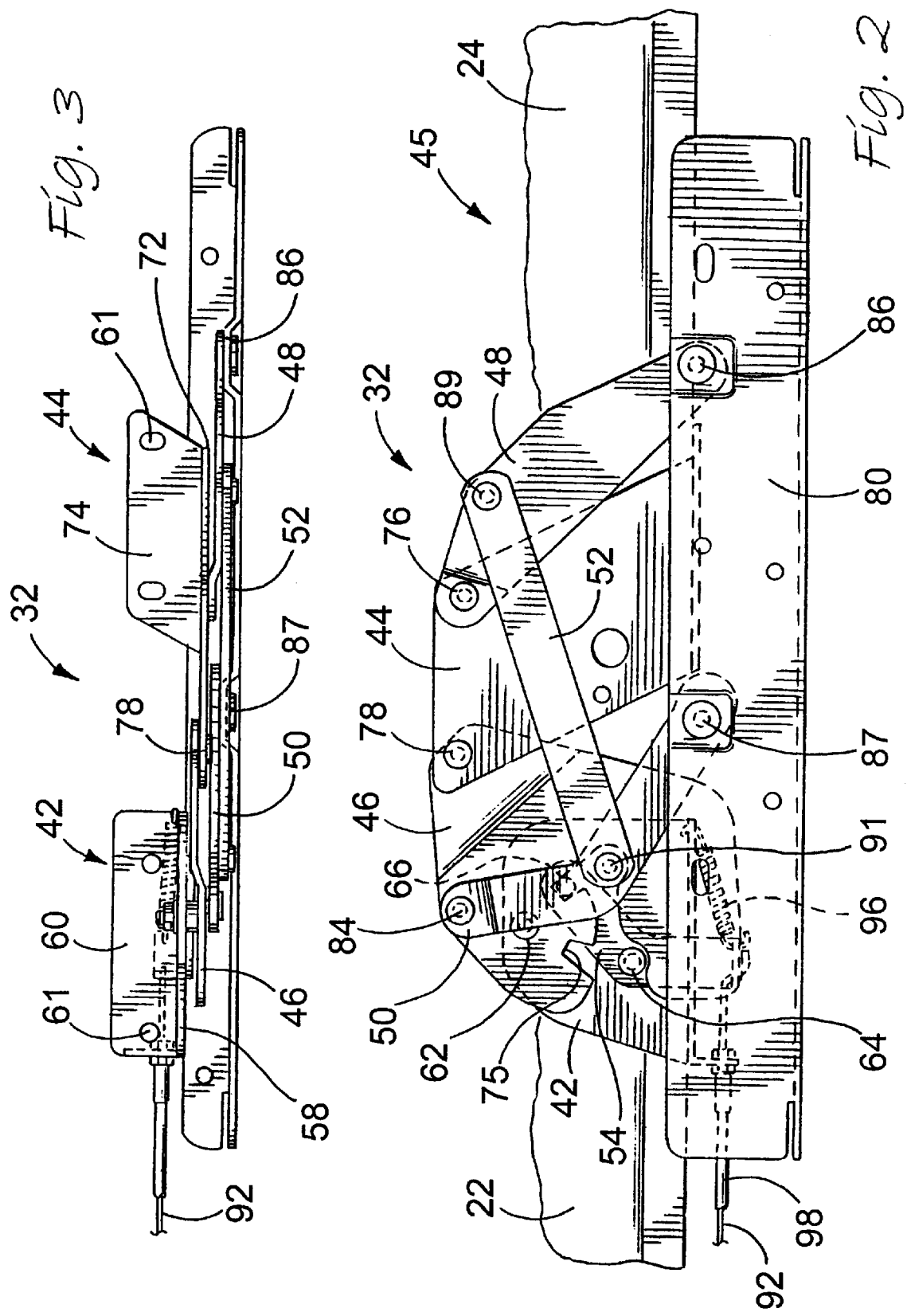

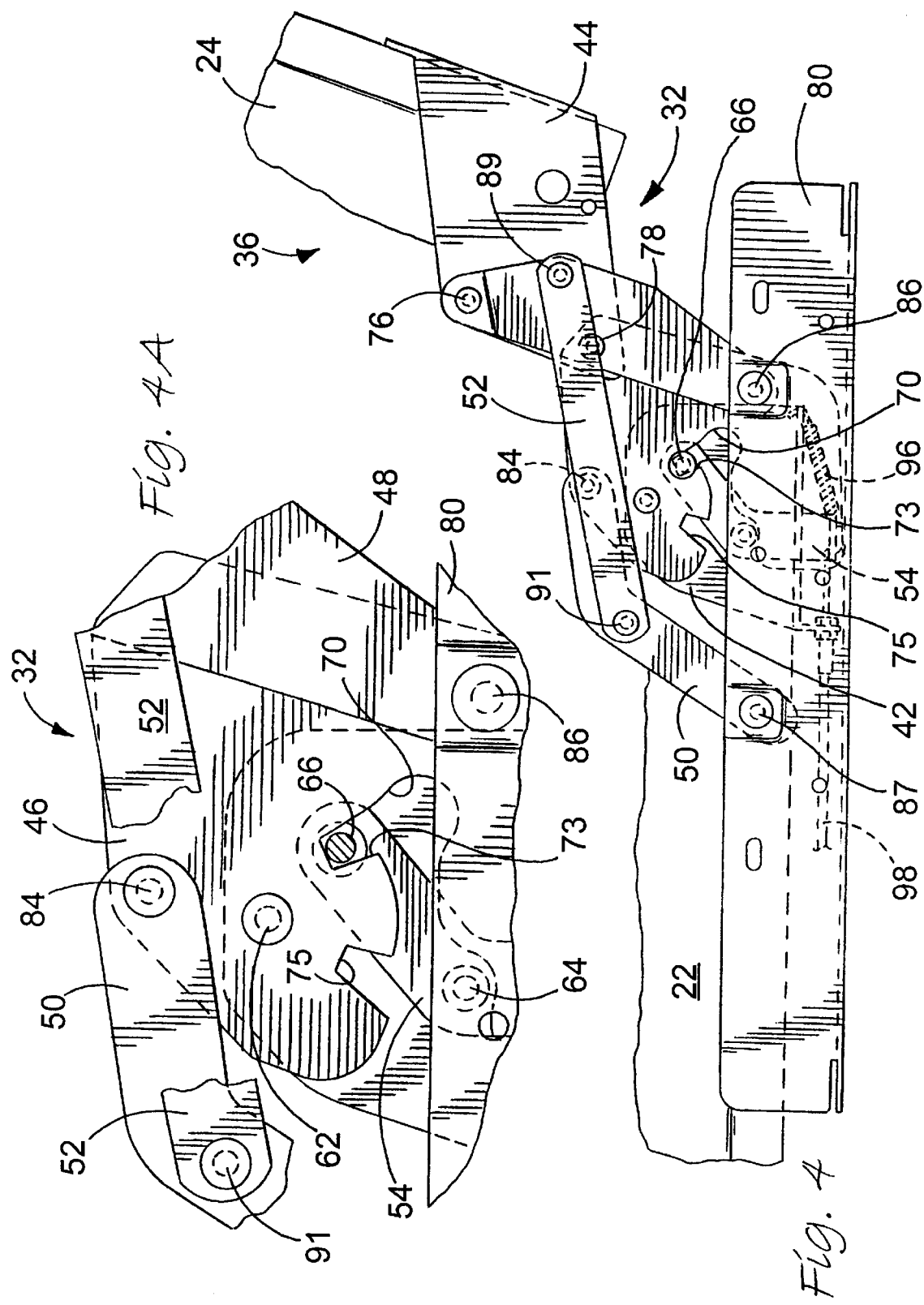

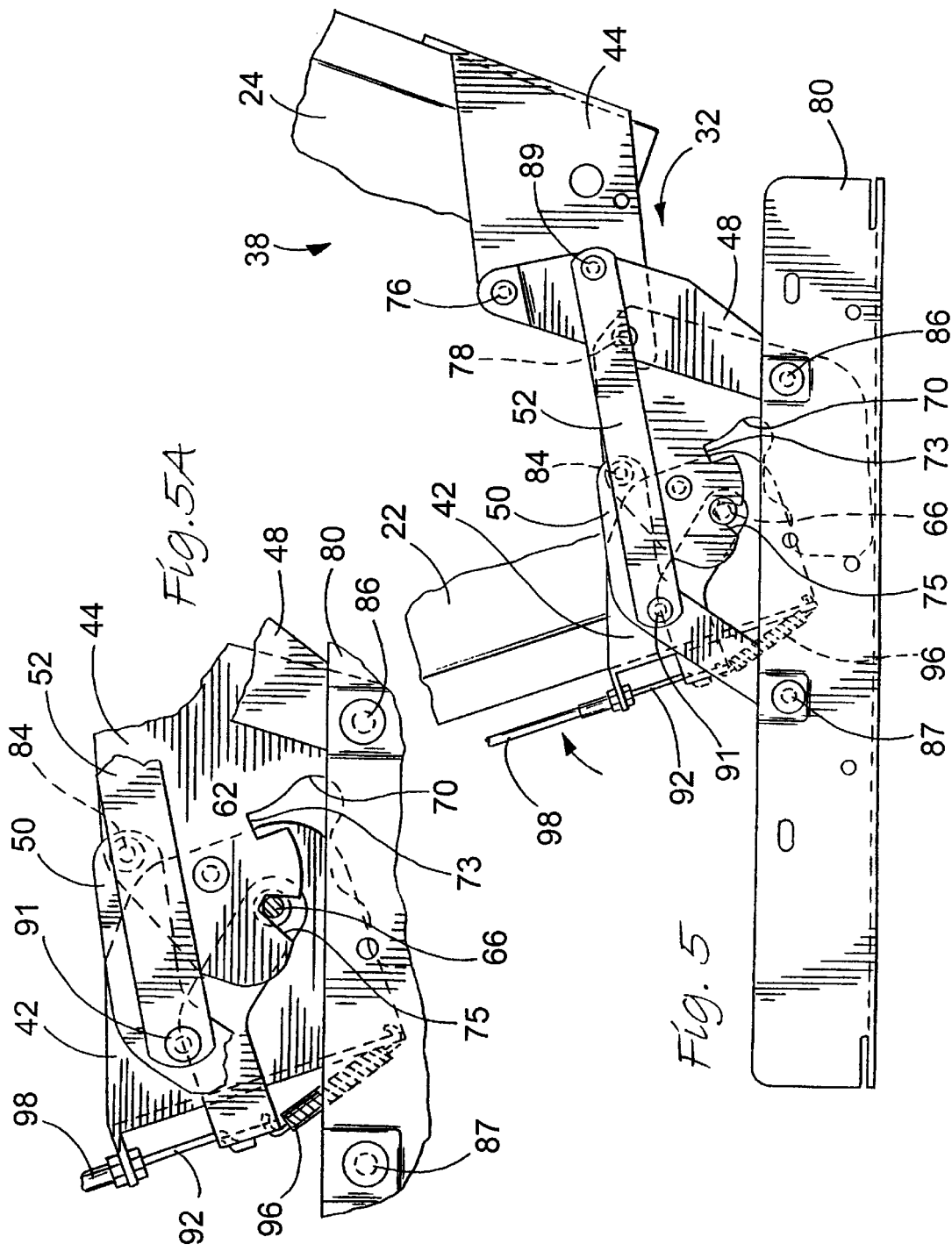

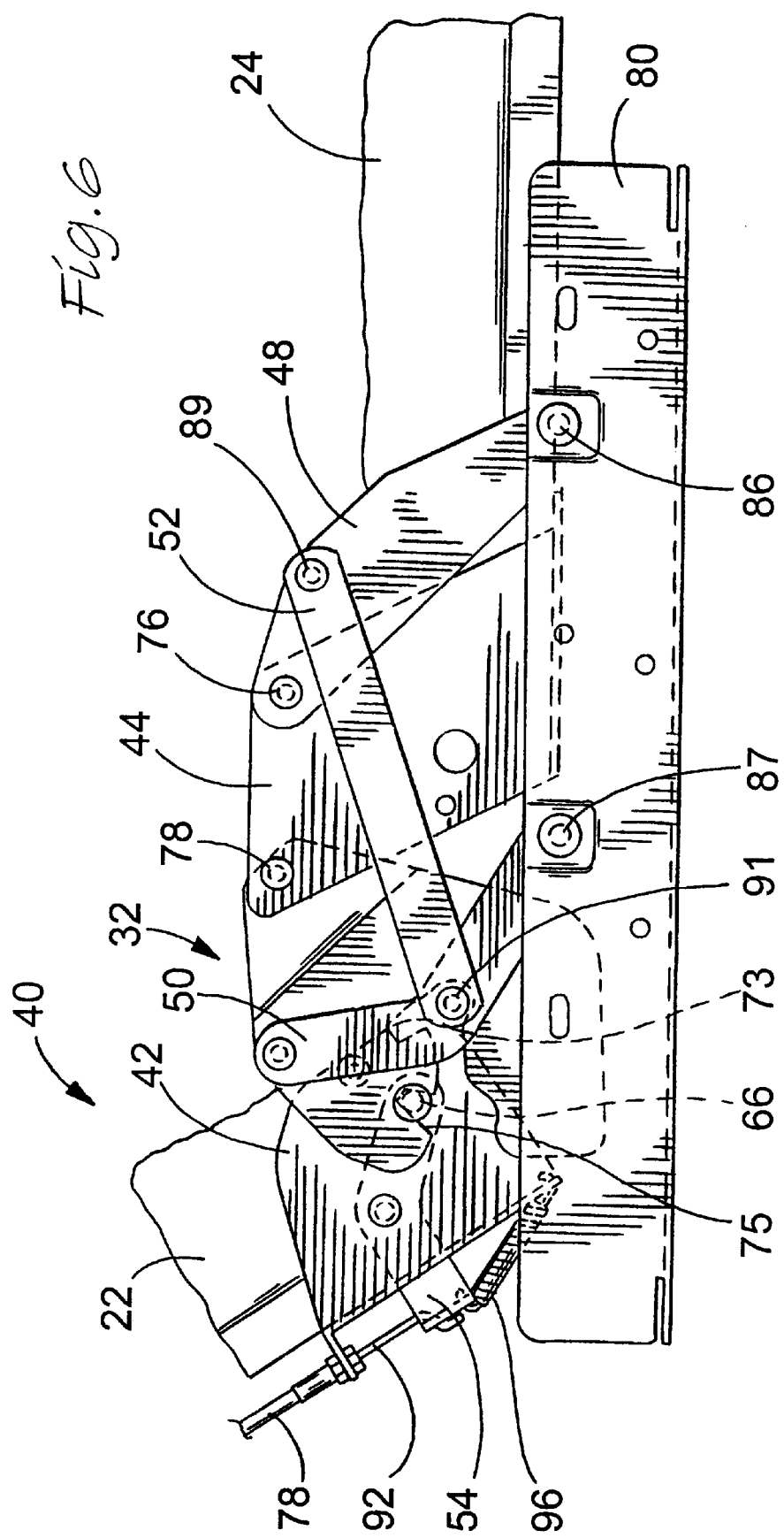

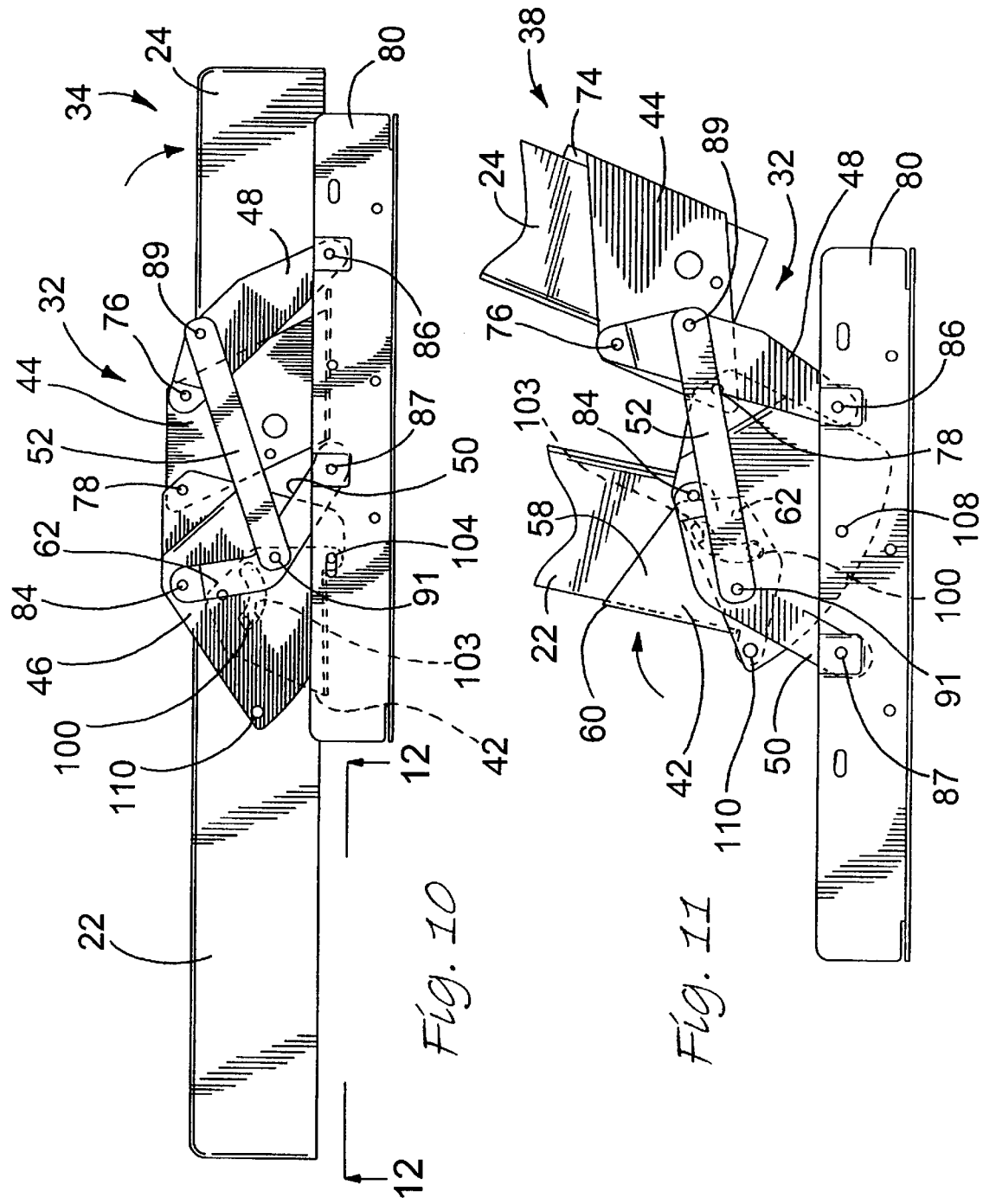

MULTI-PURPOSE RECREATIONAL VEHICLE SEAT HAVING STORAGE COMPARTMENT ACCESS

FIELD OF THE INVENTION

The present invention generally relates to multi-purpose seats, and more particularly relates to multi-purpose seats for use on recreational vehicles.

BACKGROUND OF THE INVENTION

In many recreational vehicles today, it is common to have a multi-purpose seat which can function both as a seat, a sofa, and a bed. Such seats are typically employed on recreational vehicles but can also be used in extended cab pickups, vans, and mini-vans. The seat is often configured to fold into a flat, planar configuration for use as a bed, and then fold at a juncture between the seat bottom and the seat back so as to form a seat or sofa.

It is also common in recreational vehicles today to optimize the available space therein for maximum possible usage. Given the economic and fuel efficiency drawbacks of increasing the size of the vehicle, manufacturers are continually redesigning vehicle ergonomics to take maximum advantage of available interior space. For example, U.S. Pat. No. 5,498,052 discloses a seat wherein the seat bottom can be folded parallel to the seat back to increase the storage space of the vehicle. However, no provision is made to access a space provided below such a multi-purpose seat.

Another multi-purpose seat which is currently available includes a seat bottom and a seat back which can be folded into orthogonal disposition to form a seat or sofa, and which can be folded into planar disposition for use as a bed. U.S. Pat. No. 4,085,962, invented by Wahls, discloses such a seat assembly. However, again no provision is provided to enable a user to access the storage space provided below the multi-purpose seat.

In another seat as disclosed in U.S. Pat. No. 5,238,285, especially for use in utility vehicles, the seat bottom is adapted to pivot upward to allow the seat back to fold down so as to be parallel to the seat bottom and in a forward position within the vehicle. Although such a seat effectively eliminates the back seat of the utility vehicle and enlarges the storage space of the vehicle, no provision is given for access to a storage space provided below the seat bottom.

Moreover, no prior art devices enable such a seat, which is fixed over a storage space, to be positioned in reversible directions. Such an ability would be particularly advantageous in recreational vehicles or motor homes wherein the seat could be folded in one direction to serve as, for example, a dining room seat, and then folded in a reverse direction for use in, for example, a living room area. U.S. Pat. No. 4,779,917 discloses a reversible automobile seat, but requires that the entire seat be axially moved along tracks within the vehicle to change directions. Moreover, no provision is made for access to a storage space below the seat.

SUMMARY OF THE INVENTION

It is therefore a primary aim of the present invention to provide a multi-purpose seat for use in a recreational vehicle which not only allows the seat to be used as a bi-directional seat, bi-directional sofa, and bed, but also allows for hands free access to storage space provided below the seat.

It is an objective of the present invention to provide such a multi-purpose seat at relatively low cost and without substantial required alteration to the housing on which the seat is mounted.

In accordance with these aims and objectives, it is a feature of the present invention to provide a multi-purpose seat comprised of a seat bottom and a seat back which are both hingedly attached to an open topped enclosure, and which is adapted to be positioned into one of a forward sofa position, backward sofa position, bed position, and storage access position.

It is another feature of the present invention to provide a multi-purpose seat which includes a spring biased locking pin cable assembly adapted to lock the seat into the sofa and storage access positions.

It is yet another feature of the present invention to provide a pivot hinge assembly for use on a recreational vehicle multi-purpose seat which is adapted to allow the multi-purpose seat to be positioned into any one of a bed position, forward sofa position, backward sofa position, and storage access position. The pivot hinge assembly includes a seat bottom bracket fixedly secured to the seat bottom, a seat back bracket fixedly attached to the seat back, a hinge plate pivotally attached to the seat bottom bracket and the seat back bracket, a first pivot arm pivotally attached to the side rail and the seat back bracket, a second pivot arm pivotally attached to the hinge plate and a first side rail mounted to the open top enclosure, and a cross bar pivotally attached to the first pivot arm and the second pivot arm.

It is still another feature of the present invention to allow for easy transition of the seat bottom from the sofa position to the storage access position by providing a locking slot within a hinge plate of the hinge assembly through which a locking pin rides as the seat bottom is pivoted upward from the sofa position to the storage access position.

It is still another feature of the present invention to provide a multi-purpose seat for a recreational vehicle which is adapted be configured in either a forward sofa direction or a reverse sofa direction, in addition to a bed position and a storage access position.

These and other aims, objectives, and features of the present invention will become more apparent from the following detailed description when taken in conjunction with the accompanying drawings.

BRIEF DESCRIPTION OF THE DRAWINGS

FIG. 2 is a side view of the hinge assembly of the preferred embodiment shown in the bed position;

FIG. 3 is a top view of the hinge assembly shown in FIG. 2;

FIG. 4 is a side view of the hinge assembly of the preferred embodiment in the forward sofa position;

FIG. 4A is an enlarged side view of the hinge assembly showing the locking mechanism securing the multi-purpose seat in the forward sofa position;

FIG. 5 is a side view of the hinge assembly of the preferred embodiment shown in the storage access position;

FIG. 5A is an enlarged side view of the hinge assembly showing the locking mechanism securing the multi-purpose seat in the storage access position;

FIG. 6 is a side view of the hinge assembly of the preferred embodiment in the backward sofa position;

FIG. 10 is a side view of the hinge assembly of the alternative embodiment shown in the bed position;

FIG. 11 is a side view of the hinge assembly of the alternative embodiment shown in the storage access position;

Figure 1:
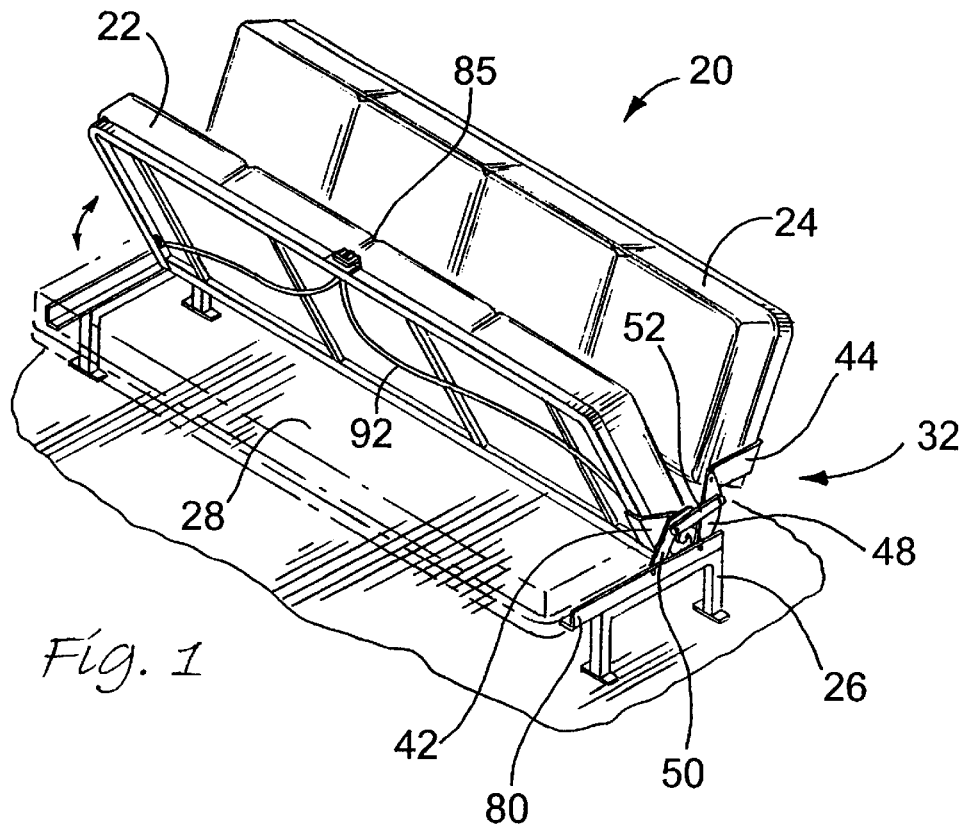
FIG. 1 is a perspective view of the preferred embodiment of the present invention showing the multi-purpose seat in the storage access position, with the sofa position being shown in phantom lines.
Figure 7:
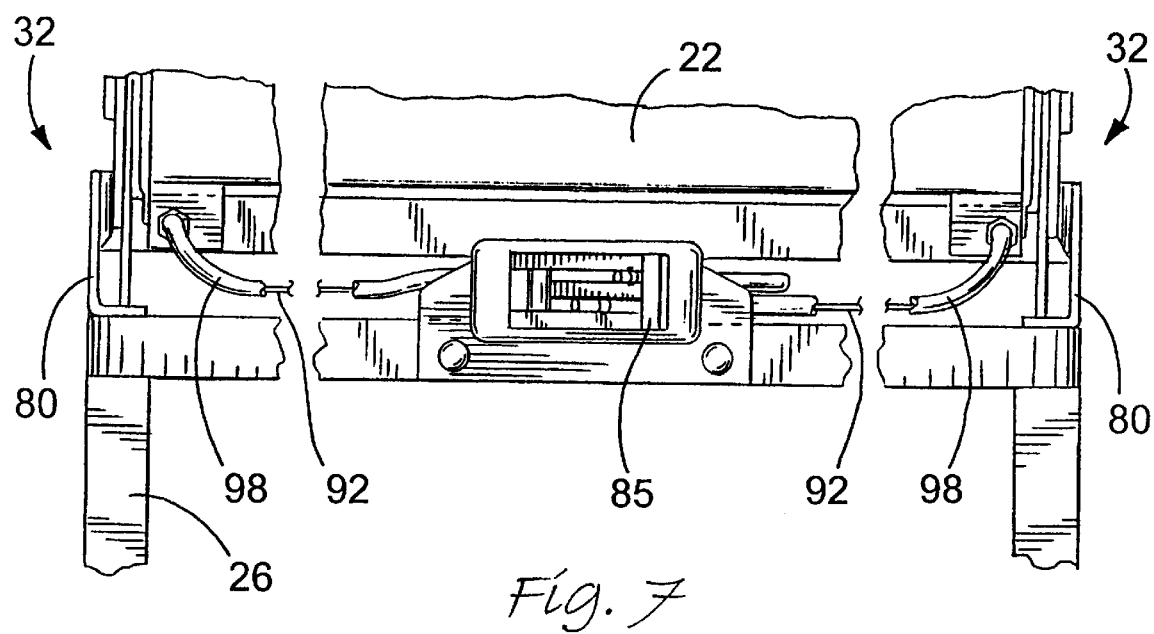
FIG. 7 is a front view of the multi-purpose seat showing the positioning of the lock release mechanism and cabling leading to the locking assembly.

While the present invention is susceptible of various modifications and alternative constructions, certain illustrative embodiments thereof have been shown in the drawings and will be described below in detail. It should be understood, however, that there is no intention to limit the present invention to the specific forms disclosed, but on the contrary, the present intention is to cover all modifications, alternative constructions, and equivalents falling within the spirit and scope of the present invention as defined by the appended claims.

DETAILED DESCRIPTION OF THE PREFERRED EMBODIMENT

As stated in the background of the invention, a multi-purpose seat for use on a motor vehicle which enables the seat to be used as both a seat and a sleeping surface is not new. Moreover, a hinge assembly which enables a seat to be folded into a flat bed-like surface, is also prevalent in the prior art, and is therefore not new. However, what is new and the focus of the present invention, is a multi-purpose seat for use in a recreational vehicle, which not only allows the seat to be used as both a sofa and a bed, but which also allows for access to the storage space provided below the seat. Since space is at a premium on recreational vehicles, it can either be physically added by increasing the size of the vehicle, and thus decreasing the efficiency of the vehicle, or the space already existing on the vehicle can be optimally utilized as is the case with the present invention. Moreover, the present invention is directed to a multi-purpose seat for use on a recreational vehicle which not only allows access to storage space provided below the multi-purpose, but which also enables the multi-purpose seat to be configured either in a forward or backward direction. This can clearly be advantageously employed onboard a recreational vehicle wherein the seat can be configured in one direction to service one area, for example a dining room, and then can be configured in a reverse direction to service another area, such as a living room.

The preferred embodiment of the present invention is shown in detail in FIGS. 1–7. As shown therein, multi-purpose seat 20 includes a seat bottom 22 and a seat back 24. Seat 20 is mounted on top of stand 26 which elevates seat 20 to a level for convenient usage by the passengers of the recreational vehicle. In addition, stand 26 creates a space 28 which is ideally suited for storage of cargo below seat 20. Typically, stand 26 will be enclosed using some form of paneling or wall board to create a completely contained space 28.

However, unlike conventional recreational vehicle seats, the preferred embodiment of the present invention provides a way by which space 28 can be conveniently accessed to satisfy the storage needs of the vehicle passengers. This objective is accomplished by providing a hinge assembly 32 which, as shown in FIGS. 2–6 can be configured into any one of four positions. As shown in FIGS. 2–3, hinge assembly 32 can be configured in a bed position 45 wherein seat bottom 22 and seat back 24 are in planar disposition. Hinge assembly 32 can also be configured in forward sofa position 36, as shown in FIGS. 4 and 4A, wherein seat bottom 22 and seat back 24 are in orthogonal disposition. As shown in FIGS. 5 and 5A, hinge assembly 32 can also be configured into storage access position 38, wherein seat bottom 22 and seat back 24 are in substantially parallel disposition. Finally, as shown in FIG. 6, hinge assembly 32 can also be configured into backward sofa position 40, wherein the seat bottom 22 and seat back 24 are again provided in orthogonal disposition, but in an opposite direction relative to forward sofa position 36.

The preferred embodiment of the present invention is able to achieve such a wide range of seat configurations through the novel construction of pivot hinge assembly 32. As can be seen in FIGS. 2–6, the preferred embodiment of hinge assembly 32 includes seat bottom bracket 42, seat back bracket 44, hinge plate 46, first pivot arm 48, second pivot arm 50, crossbar 52, and locking arm 54. It is through the inventive operation of pivot hinge assembly 32, that the preferred embodiment of the present invention is able to assume the aforementioned positions, and most importantly, allow access to storage space 28.

Turning to the description of each component in greater detail, seat bottom bracket 42 includes planar member 58, and integral, but orthogonally disposed, seat flange 60 (See FIG. 3). As is conventional, seat flange 60 includes a series of apertures 61 or other fastening means to connect the bottom of a seat to seat bottom bracket 42. It can be seen that seat bottom bracket 42 includes hinge plate pivot 62 and locking arm pivot 64. As shown in FIGS. 2–6, it is at hinge plate pivot 62 that seat bottom bracket 42 is pivotally connected to hinge plate 46. In the preferred embodiment, a conventional nut and bolt are used, but it is to be understood that as with all pivots referred to herein, any means of pivotal attachment can be used. It can also be seen, especially with observation of FIGS. 4A and 5A, that it is at locking arm pivot 64 that locking arm 54 is attached to seat bottom bracket 42, and that locking arm 54 includes locking pin 66 which engages notches 73 and 75 within locking slot 70 to lock seat bottom bracket 42 into forward sofa position 36, backward sofa position 40 and storage access position 38.

With regard to seat back bracket 44, it can be seen that similar to seat bottom bracket 42, seat back bracket 44 includes planar members 72 and integral, but orthogonally disposed, seat flange 74 (See FIG. 3). Seat flange 74 is similarly provided with a plurality of apertures 61 for connection of seat flange 74 to the back of a seat back 24. Planar member 72 of seat back bracket 40 includes first arm pivot 76 and hinge plate pivot 78. As shown in FIGS. 2–6, first pivot arm 48 is pivotally attached to seat back bracket 44 at first arm pivot 76 and is pivotally attached to side rail 80 at pivot 86. Side rail 80 in turn is connected to seat stand 26 which provides storage space 28. Similarly, second pivot arm 50 is attached to side rail 80 at pivot 87. It can also be seen that seat back bracket 44 is pivotally attached to hinge plate 52 at hinge plate pivot 78. Cross bar 52 is connected to first pivot arm 48 at pivot 89, and to second pivot arm 50 at pivot 91.

Hinge plate 46 includes second pivot arm aperture 84, seat bottom bracket pivot 62 (also referred to as hinge plate pivot 62), locking slot 70, and seat back bracket pivot 78 (also referred to as hinge plate pivot 78). As can be seen in comparison of FIGS. 4 and 5, as seat bottom 22 and seat bottom bracket 42 are pivoted upward to storage access position 46, locking pin 66 rides within locking slot 70. At storage access position 46, locking pin 66 engages notch 75 of hinge plate 42 to lock seat bottom bracket 48 in the storage access position. Similarly, at forward sofa position 36, pin 66 engages notch 73 to lock seat 20 into position. In order to release locking pin 66, spring biased cable 92 is provided with a conventional release handle 85. By pulling on handle 85 (See FIGS. 1 and 7), spring 96 is overcome and cable 92 is pulled through sheath 98 to, in turn, pull locking arm 54, and thus pin 66, out of engagement with notch 73 or 75. Upon release of handle 85, spring 96 biases arm 54 and pin 66 into locking engagement.

Figure 8:
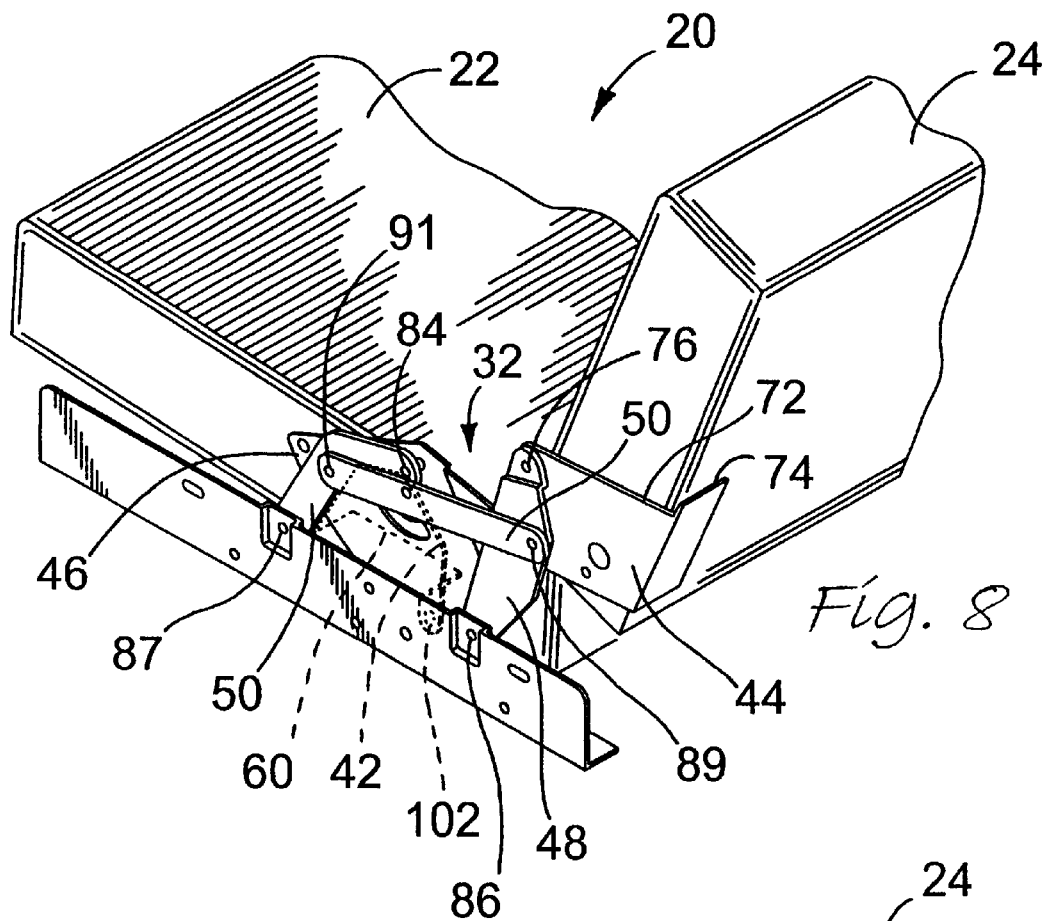
FIG. 8 is a perspective view of an alternative embodiment of the present invention showing the multi-purpose seat in the sofa position.

Referring now to FIG. 8, an alternative embodiment of the present invention is shown in the storage access position. For the sake of clarity, reference numerals identical to the preferred embodiment are used where appropriate in describing the alternative embodiment. As shown therein, multi-purpose seat 20 includes a seat bottom 22 and a seat back 24. Seat 20 is adapted to be mounted over an enclosure (not shown) rigidly secured to the floor of the vehicle. The enclosure normally includes a front, back, and four sides, leaving an open top. The enclosure is provided as a base to support the seat and raise the seat to a height sufficient for comfortable use. Given its shape, the enclosure naturally provides a storage space perfectly adapted for many cargo storage needs.

Figure 9:
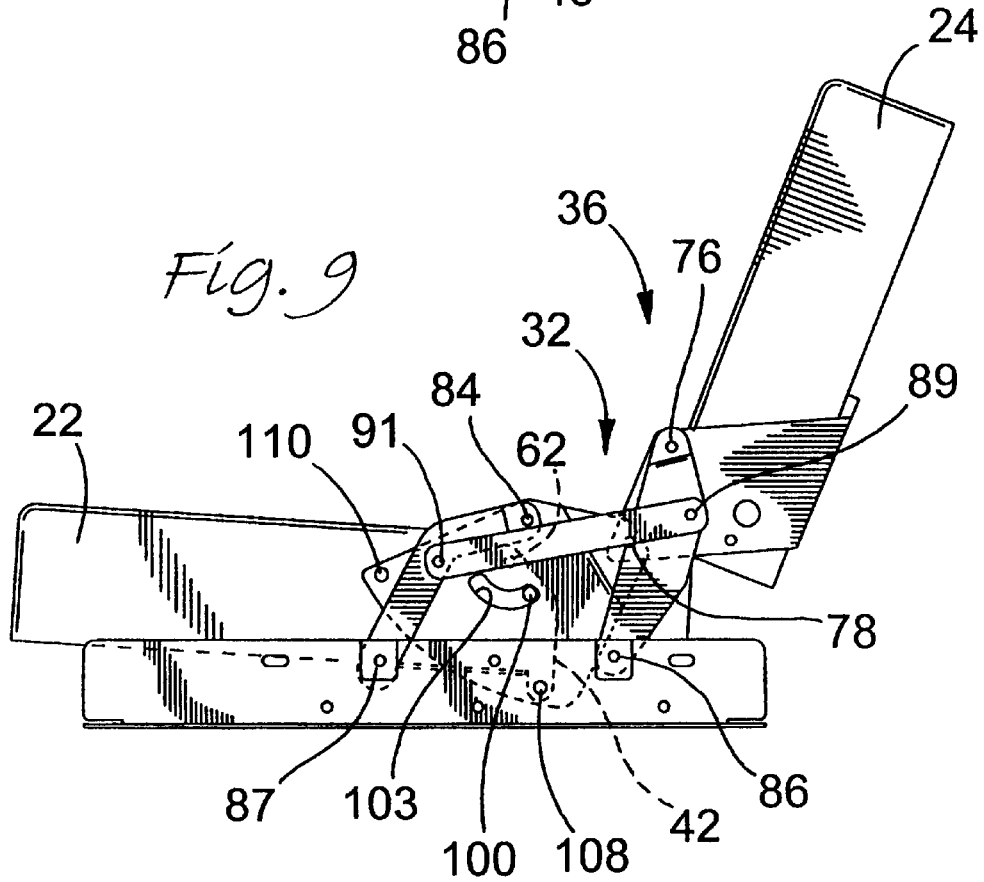
FIG. 9 is a side view of the hinge assembly of the alternative embodiment shown in the sofa position.

As with the preferred embodiment of the present invention, the alternative embodiment provides a novel pivot hinge assembly 32 as best shown in FIGS. 9–11, which is adapted to allow multi-purpose seat 20 to be configured in multiple positions. However, the alternative embodiment does not include a backward sofa position. Rather, it includes the bed position 34 shown in FIG. 10, the sofa position 36 shown in FIG. 9, and the storage access position 38 shown in FIG. 11. It can therefore be seen that in the bed position 36, seat bottom 22 and seat back 24 are disposed in the same plane, whereas in sofa position 36, seat bottom 22 and seat back 24 are substantially orthogonally disposed, and in storage access position 38, seat bottom 22 is substantially parallel to seat back 24 to allow access to the storage space.

Referring now with specific reference to FIG. 8, pivot hinge assembly 32 is shown being comprised of seat bottom bracket 42, seat back bracket 44, hinge plate 46, first pivot arm 48, second pivot arm 50, and cross bar 52. As opposed to the preferred embodiment, a locking arm is not included as a different type of locking mechanism is employed. This necessarily alters portions of the aforementioned components compared to the preferred embodiment.

Seat bottom bracket 42 again includes planar member 58 and integral, but orthogonally disposed, seat flange 60. As is conventional, seat flange 60 includes a series of apertures or other fastening means to connect the bottom of seat bottom 22 to seat bottom bracket 42. It can also be seen that seat bottom bracket 42 includes hinge plate pivot 62, guide pin 100, and locking pin aperture 102. As shown in FIGS. 9–11, it is at hinge plate pivot 62 that seat bottom bracket 42 is pivotally connected to hinge plate 46. It can also be seen, especially with observation of FIGS. 9 and 11, that it is through arcuate slot 103 of hinge plate 46 that guide pin 100 is connected to allow for arcuate travel of pin 100 through arcuate slot 103. The function of locking pin aperture 102 will be described in further detail herein with reference to the operation of the locking mechanism of the alternative embodiment.

Turning now to seat back bracket 44, it can be seen that similar to seat bottom bracket 42, seat back bracket 44 includes planar members 72 and integral, but orthogonally disposed, seat flange 74. Seat flange 74 is similarly provided with a plurality of apertures for connection with seat flange 74 to the back of seat back 24. Planar member 72 of seat back bracket 44 includes first arm pivot 76 and hinge plate pivot 78. As shown in FIGS. 9–11, first pivot arm 48 is pivotally attached to seat back bracket 44 at first arm pivot 76 and is pivotally attached to side rail 80 at side rail pivot 86. Rail 80 in turn is connected to a seat stand to provide the aforementioned storage space. It can also be seen that seat back bracket 44 is pivotally attached to hinge plate 46 at hinge plate pivot 78.

With regard to hinge plate 46, it includes second arm pivot 84, seat bottom bracket pivot 62, arcuate slot 103, downward locking aperture 108, and upward locking aperture 110. As can best be seen in a comparison of FIGS. 9 and 11, as seat bottom 22 and seat bottom bracket 42 are is pivoted upward to storage access position 38, guide pin 100 rides within arcuate slot 103. Upon reaching storage access position 38, locking pin aperture 102 of seat bottom bracket 42 is aligned with upward locking aperture 110 of hinge plate 46. This allows locking pin 104 to penetrate therethrough as will be described in further detail herein. Similarly, in sofa position 36, locking pin aperture 102 of seat bottom bracket 42 is aligned with downward locking aperture 108 of hinge plate 46 to secure seat 20 in the sofa position. It is only upon release of locking pin 104 that seat 20 can be repositioned to storage access position 38.

Again referring to FIGS. 9–11, second pivot arm 50 is shown attached to side rail 80 at pivot 87 and to second arm pivot 84 of hinge plate 46. Finally, second pivot arm 50 is connected to cross bar 52 at pivot 91. Cross bar 52 is then pivotally connected at its other end to first pivot arm 48 at pivot 89.

In operation, it can therefore be seen that with the alternative embodiment of the present invention when it is desired to move seat 20 from bed position 34, seat bottom 22 is lifted slightly and pushed backward from a position shown in FIG. 10 to the position shown in FIG. 9. The force of the backward movement causes second pivot arm 50 to pivot about its connection with side rail 80 which in turn causes hinge plate 46 to move backward, and given its pivotal connection to seat back bracket 44, causes seat back 24 to rise into orthognal disposition relative to seat bottom 22.

When it is desired to move from the sofa position 36 to storage access position 38, seat bottom 22 is lifted upward so as to be substantially parallel with seat back 24. The force of this upward movement causes seat bottom bracket 42 to pivot relative to hinge plate 46. To facilitate this movement, guide pin 100 rides within arcuate slot 103. The transition from sofa position 36 to storage access position 38, therefore does not necessitate any movement of first pivot arm 48, seat back bracket 44, cross bar 52, hinge plate 46, or second pivot arm 50. Rather, the entire movement is accomplished between seat bottom bracket 42 relative to hinge plate 46.

Figure 12:
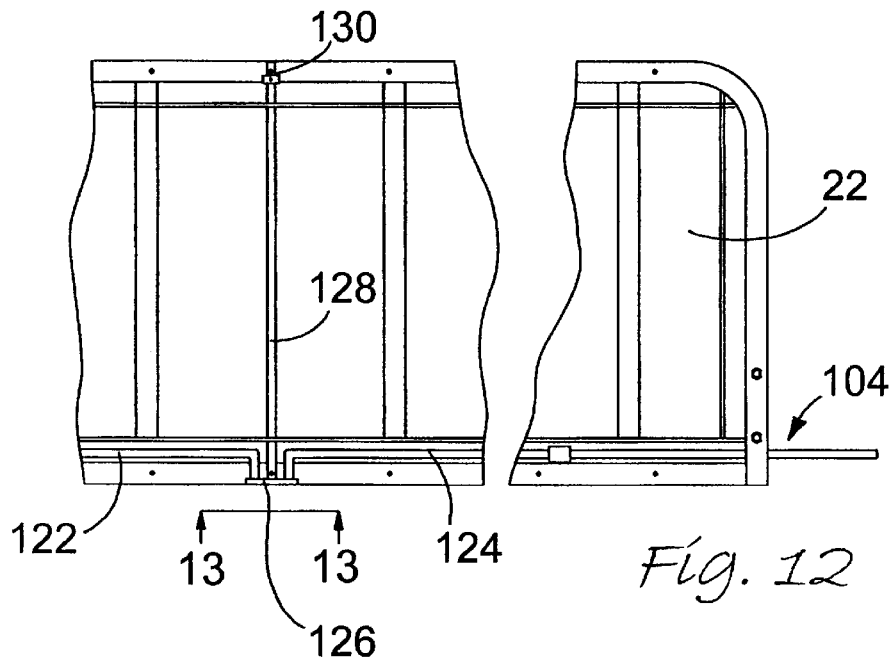
FIG. 12 is a bottom view of the seat bottom showing an alternative mechanism including guide pins and release handle.
Figure 13:
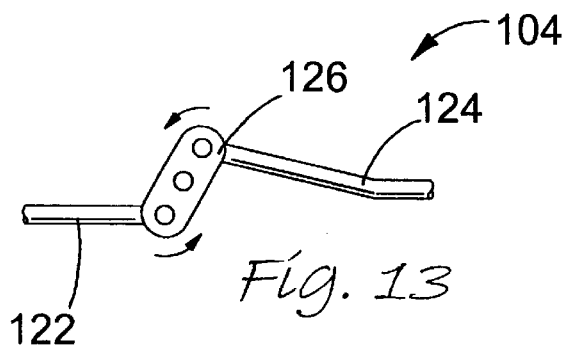
FIG. 13 is a bottom view of the alternative embodiment shown in FIG. 12 taken along line 13—13.
Figure 14:
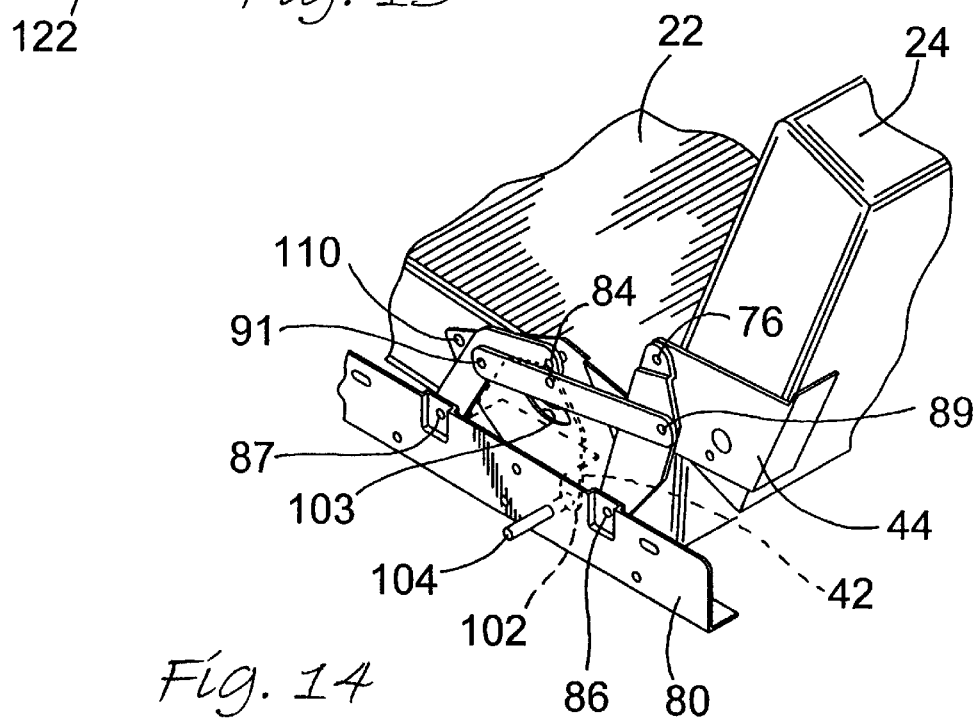
FIG. 14 is a perspective view of the alternative embodiment shown in the seat position depicting the interaction of the locking mechanism.

However, in order to move seat bottom 22 from sofa position 36 to storage access position 38, locking pin 104 must first be released. Locking pin 104 is best shown in FIGS. 12–14. As shown therein, locking pin 104 is comprised of a pair of arm pins 122 and 124 which are pivotally attached to pivot plate 126 which in turn is attached to extension arm 128 having user engageable handle 130. Locking pins 122 and 124 can be positioned outward for locking engagement with locking pin apertures 102 of seat bottom brackets 42, and locking apertures 108 or 110 of hinge plate 46.

When it is desired to move seat bottom 22 upward, handle 130 is pivoted outward, which in turn rotates extension arm 128 and pivot plate 126, to cause locking pins 122 and 124 to move inward and out of engagement with locking pin apertures 102 and downward locking aperture 108. Seat bottom 22 can then be freely rotated upward. Seat bottom 22 is rotated upward until locking pin apertures 102 aligns with upward locking apertures 110, at which time locking pins 122 and 124 can be moved outward and into penetrating engagement with upward locking apertures 110. When it is desired to move seat bottom 22 back to sofa position 36, handle 130 must again be rotated to release locking pin 104.

It can therefore be seen that the present invention brings to the art a new and improved multi-purpose seat for use on a recreational vehicle. Heretofore, it has been impossible to gain access to existing storage space provided below recreational vehicle multi-purpose seats. By providing a pivot hinge assembly mounted to both sides of the seat, the seat can not only be positioned to move between the bed position and sofa position, it can also be moved to a storage access position, wherein the seat bottom is parallel to the seat back to allow access to the storage space. Not only is access allowed to the storage space, but the seat is made sufficiently secure by a locking mechanism to prevent inadvertent movement between the bed position and the storage access position. Moreover, by providing a pivot hinge assembly which requires only two fixed attachments between the assembly and the side rail, minimal modification and alteration is required of already existing equipment which therefore enables the present invention to be manufactured and assembled at relatively low additional costs. Furthermore, the unique hinge assembly of the present invention enables the multiple purpose seat to include both a forward and backward facing sofa to greatly expand the versatility of the seat for use on a recreational vehicle.

What is claimed is:

1. A multi-purpose seat for a recreational vehicle, the seat having access to storage space provided below the multi-purpose seat, the multi-purpose seat comprising:

a housing having an open top defining the storage space;

a seat bottom hingedly attached to the housing top and adapted to move between a bed position, forward sofa position, a backward sofa position, and a storage access position;

a seat back hingedly attached to the housing top and adapted to move between a bed position, forward sofa position, a backward sofa position, and a storage access position;

the seat bottom and seat back being disposed in the same plane and covering the open top of the housing when the multi-purpose seat is in the bed position;

the seat bottom and seat back being substantially orthogonally disposed and the seat bottom covering the housing open top when the multi-purpose seat is in the forward sofa position;

the seat bottom and seat back being substantially orthogonally disposed and the seat back covering the housing open top when the multi-purpose seat is in the backward sofa position;

the seat bottom and seat back being substantially parallel and the housing open top being uncovered when the multi-purpose seat is in the storage access position; and a locking mechanism adapted to lock the multi-purpose seat into the backward sofa position, the forward sofa position and the storage access position;

the seat bottom and seat back being hingedly attached to the housing by a pivot assembly having first and second pivot arms pivotally attached to the housing, a cross bar pivotally attached to the first and second arms, a seat bottom bracket fixedly attached to the seat bottom, a seat back bracket fixedly attached to the seat back and pivotally attached to the first pivot arm, and a hinge plate pivotally attached to the seat back bracket, the second pivot arm and the seat bottom bracket.

2. The multi-purpose seat of claim 1 further comprising a first side rail and a second side rail, each attached to the housing, and the pivot hinge assembly comprises a first hinge assembly provided on a first end of the seat, a second hinge assembly provided on a second end of the seat, and the first and second hinge assemblies are attached to first and second side rails.

3. The multi-purpose seat of claim 1 further including a locking mechanism adapted to lock the multi-purpose seat into the forward sofa position, the backward sofa position, and the storage access position, the locking mechanism including a spring biased cable adapted to move a locking pin disposed between the seat bottom bracket and the hinge plate, the spring biased cable including a centrally located release handle adapted to move the cable against the biasing force of the spring.

4. The multi-purpose seat of claim 3 wherein the hinge plate further includes a locking slot having a pair of locking notches into which the locking pin is adapted to enter to lock the seat bottom in the sofa or storage access positions.

5. The multi-purpose seat of claim 3 wherein the spring biased cable extends to the pivot hinge assemblies provided on the first and second ends of the multi-purpose seat.

6. A pivot hinge assembly for a recreational vehicle multi-purpose seat adapted to allow the multi-purpose seat to be positioned into a bed position, a forward sofa position, a backward sofa position, and a storage access position, the multi-purpose seat being mounted onto an open top enclosure, the enclosure having side rails, the hinge assembly comprising:

a seat bottom bracket fixedly secured to the seat bottom;

a seat back bracket fixedly attached to the seat back;

a hinge plate pivotally attached to the seat bottom bracket and the seat back bracket;

a first pivot arm pivotally attached to the side rail and the seat back bracket;

a second pivot arm pivotally attached to the hinge plate and the side rail;

and a cross bar pivotally attached to the first pivot arm and the second pivot arm.

7. The hinge assembly of claim 6 wherein the hinge plate further includes a locking slot with a locking pin passing therethrough and being connected to a locking arm, the locking slot including first and second notches adapted to receive the locking pin to lock the seat into the sofa and storage access positions.

8. The hinge assembly of claim 7 wherein the locking arm is controlled by a spring biased cable having a user engagable handle.

9. The hinge assembly of claim 8 wherein the spring-biased cable extends to locking arms and hinge assemblies provided on first and second ends of the multi-purpose seat.

10. A multi-purpose seat for use on a recreational vehicle having access to storage space provided below the multi-purpose seat, the multi-purpose seat comprising:

a housing having an open top defining a storage space;

a seat bottom hingedly attached to the housing top and adapted to move between a bed position, a sofa position, and a storage access position;

a seat back hingedly attached to the housing top and adapted to move between a bed position, and a sofa position;

the seat bottom and the seat back being disposed in the same plane and covering the open top of the housing when the multi-purpose seat is in the bed position, the seat bottom and seat back being substantially orthogonally disposed and the seat bottom covering the housing open top when the multi-purpose seat is in the sofa position, the seat bottom and seat back being substantially parallel and the housing open top being uncovered when the multi-purpose seat is in the storage access position; and a locking mechanism adapted to lock the multi-purpose seat into the storage access position;

wherein the seat bottom and the seat back are hingedly attached to the housing by a pivot hinge assembly having first and second pivot arms pivotally attached to the housing, a cross bar pivotally attached to the first and second arms, a seat back bracket fixedly attached to the seat back and pivotally attached to the first pivot arm, a hinge plate pivotally attached to the seat back bracket and the second pivot arm, and a seat bottom bracket pivotally connected to the hinge plate.

11. The multi-purpose seat of claim 10 further including a locking mechanism adapted to lock the multi-purpose seat into the storage access position, the locking mechanism including a rod adapted to penetrate apertures provided in the hinge plate and bottom bracket to prevent relative movement between the hinge plate and the seat bottom bracket, the rod being releasable to allow the bottom bracket to pivot relative to the hinge plate and place the multi-purpose seat into the storage access position, the hinge plate having a second aperture to allow the rod to pass therethrough to lock the multi-purpose seat into the storage access position.

12. The multi-purpose seat of claim 11 wherein the locking mechanism further includes a user engagable handle attached to a pivot plate, the pivot plate attached to the locking rods, rotation of a handle causing release of the locking rods.

13. The multi-purpose seat of claim 11 wherein the seat bottom bracket further includes a bushing in the locking pin aperture to facilitate penetration of the locking pin therethrough.

14. The multi-purpose seat of claim 10 further including side rails attached to the housing, the first and second pivot arms being attached directly to the side rails.

15. The multi-purpose seat of claim 10 wherein the hinge plate further includes a arcuate slot and a pin passing therethrough and being connected to the seat bottom bracket, the arcuate slot defining a path for the pin as the seat bottom is pivoted upward relative to the hinge plate when the multi-purpose seat is moved from the sofa position to the storage access position.

* * * * *